United States Patent [19]
Meier

[11] 3,897,681
[45] Aug. 5, 1975

[54] FORCE MEASURING APPARATUS OF THE VIBRATORY STRING TYPE

[75] Inventor: Eugen Meier, Meilen, Switzerland

[73] Assignee: Mettler Instrumente AG, Zurich, Switzerland

[22] Filed: May 11, 1973

[21] Appl. No.: 359,258

Related U.S. Application Data

[63] Continuation-in-part of Ser. No. 252,458, May 11, 1972, abandoned.

[30] Foreign Application Priority Data

| June 23, 1971 | Switzerland | 9157/71 |
| Sept. 29, 1971 | Switzerland | 14174/71 |
| Dec. 8, 1972 | Switzerland | 17874/72 |

[52] U.S. Cl............. 73/141 R; 73/DIG. 1; 177/210
[51] Int. Cl.² .......................................... G01L 1/10
[58] Field of Search ...... 73/141 R, 141 AB, DIG. 1, 73/517 AV, 382; 177/210; 331/156

[56] References Cited
UNITED STATES PATENTS

| 1,806,741 | 5/1931 | Cameron | 177/225 UX |
| 2,793,026 | 5/1957 | Giardino et al. | 177/225 |
| 3,382,942 | 5/1968 | Schmitter | 177/170 |
| 3,612,198 | 10/1971 | Gallo | 177/210 |
| 3,621,713 | 11/1971 | Wirth et al. | 73/141 A |
| 3,712,395 | 1/1973 | Streater et al. | 177/210 |

FOREIGN PATENTS OR APPLICATIONS

| 671,392 | 5/1952 | United Kingdom | 73/382 |
| 1,155,412 | 6/1969 | United Kingdom | 177/210 |

*Primary Examiner*—Charles A. Ruehl
*Attorney, Agent, or Firm*—Lawrence E. Laubscher

[57] ABSTRACT

Improved force measuring apparatus of the one- or two-string type, including means for applying to the movable member of the apparatus a corrective force that compensates for non-linearities in the response of the apparatus over the full range of travel of the pan carrier member between the no-load and full-load positions, thereby to produce a linear variation in the resulting oscillation frequency with respect to load. In the one-string embodiment, linearization means are provided for applying to the oscillatory string means a corrective force that varies quadratically with the displacement of the movable member over its full range between the no-load and full-load positions. In the two-string embodiment, decoupling spring means are provided for independently connecting the two strings in opposite senses between the frame and pan carrier members. The aforementioned linearization means and/or temperature compensation means are also provided for improving the operation of the two-string embodiment.

25 Claims, 21 Drawing Figures

FORCE MEASURING APPARATUS OF THE VIBRATORY STRING TYPE

This application is a continuation-in-part application of the parent application Ser. No. 252,458 filed May 11, 1972 in the name of Eugen Meier entitled Force Measuring Apparatus, now abandoned.

This invention relates generally to force-measuring apparatus of the type including at least one pretensioned string (i.e., wire or filament) which is excited to a state of transverse oscillation by electronic means, the change in frequency of the oscillations under the influence of a force which varies the tension of the string being a measurement of the magnitude of said force.

Force-measuring instruments of this general type are faced with a fundamental problem resulting from the physical fact that the oscillation frequency of a string varies substantially with the root of the force which tensions the string. In most cases this problem has been avoided by using two strings. One difficulty with such devices is the problem of properly decoupling the two strings relative to each other to effect better oscillation quality. Devices having only one string were usually restricted to use in cases in which the force acting on the apparatus is in turn in a quadratic relationship with a third magnitude which is to be determined (see Swiss Pat. No. 427,345, entitled "Through-flow Measuring Means"). Various problems arose in evaluating the measurements, which problems could be solved only by the use of relatively expensive means. Therefore, even recently, the view was taken that systems with one string were unsuitable for force measurement (Technische Mitteilung 1970, issue No. 1, pages 16 and 17).

A primary object of the present invention is to provide an improved force-measuring apparatus of the one-string or two-string type, said invention being characterized by the provision of means for applying to the oscillating string means over the full length of travel of the pan carrier member from the no-load position a corrective force that effects accurate completely linear measurement of the load. In the one-string embodiment, linearizing compensation means are provided for applying to the pan carrier member a correction force that varies quadratically with the displacement of the movable member from the no-load position toward the full-load position. In the two-string embodiment, novel decoupling spring means are provided for independently connecting each of the string members in the opposite sense between the frame and pan carrier members. The linearizing means for applying a corrective force to the pan carrier member may be further incorporated in the two-string embodiment. Furthermore, temperature compensation means may be provided for applying to the pan carrier member a corrective force to compensate for temperature-responsive variations in the physical properties of the string and spring elements.

The oscillating string—which is driven by electronic drive means—is connected under tension between the frame and pan carrier members, whereby when the tension of the string is varied by the application thereto of a force to be measured, the resulting change in oscillating frequency is detected to afford a measurement of the magnitude of said force. The string is normally tensioned by resilient means through which the force is transmitted to the string.

The relationship between the change in oscillation frequency and the change in force can be expressed in known manner by an exponential series which can be written in general form as follows:

$$\Delta f \approx K_1 \Delta P + K_2 \Delta P^2 + K_3 \Delta P^3 + \ldots$$

wherein $\Delta f$ represents the change in frequency, $\Delta P$ represents the change in force, and $K_1, K_2 \ldots$ represent coefficients which include inter alia the pre-load.

As can be shown by calculation, the value of the coefficients decreases rapidly with increasing index in the case of a pre-load which is sufficiently high in relationship to the measuring range. The expression at the fourth power of the series does not generally need to be taken into account, as its value lies in the relative order of $10^{-6}$ and below. Also the third member of the series generally has only very little influence on non-linearity, depending on the particular design of the force-measuring apparatus. The main part is played by the second member of the series.

Accordingly, a more specific object of the present invention is to provide a force-measuring apparatus of the type described above, including compensating means for exerting on the string a compensating force that corrects the dependency of the change in frequency on the magnitude of the force to be measured. Preferably the compensating means is operable to produce linearization of measurement throughout the operating range of the apparatus.

In accordance with a more specific object of the invention, linearization of measurement is achieved by including in the compensating means an interference force member that influences quadratically the change in oscillation frequency. Furthermore, in certain cases, means may be provided also for cubically influencing the change in frequency. Thus, the compensating means act on the movable portion of the force-measuring apparatus in such a way that there are superimposed on the force to be measured, further interference forces which vary non-linearly with the movement of the movable portion.

A necessary condition for linearization in the above mentioned manner is that the movable portion of the apparatus must cover a substantial distance. This condition can be easily fulfilled, however, by connecting the string by means of a resilient member, for example a coil spring.

In accordance with a preferred embodiment of the invention, the compensating means is of the quadratic type including a plurality of magnets that exert on each other a force that varies inversely to the square of their distance. According to alternate embodiments of the invention, the compensating means include resilient means of simple construction, as for example, rotary springs (preferably, non-linear coil springs) which can be loaded in tension or compression, or bending springs (preferably, spiral springs) which apply a non-linear force on the movable portion by way of a moment on an effective lever arm that varies in accordance with a cosine function. In this regard, a coil spring which can be subjected to a bending load is also suitable for use in the present invention.

Finally, in accordance with a further embodiment of the invention, the compensation means may comprise a weight on a lever arm normal to the force to be measured, which lever arm varies non-linearly under the influence of said force.

It has been found advantageous for the movable portion of the apparatus to be connected to the fixed portion by a parallel guide means.

Instruments of the two-string type are employed for use as dynamometers, balances, and mass gauges, and also for measuring lengths and tension. In these instruments, the variation in oscillation frequency of the strings as a consequence of variation in the string tension affords an indication of the load being measured.

An essential prerequisite for precise measuring results consists in a perfect decoupling of the strings not only in order to keep disturbing external oscillations away from the strings (i.e., passive decoupling), but also in order to prevent an energy drain from the string (i.e., active decoupling). In this respect it has already been proposed in the art to couple the strings by means of supporting members, such as knuckle joints at one end with the stationary part of the instrument, and on the other end with the movable part thereof. While this arrangement has produced already markedly improved results, it still leaves something to be desired, particularly with respect to the decoupling between the strings and the movable part. Furthermore, tests have shown that in multi-string systems it is very important to decouple the individual strings with respect to each other as far as oscillation is concerned.

Accordingly, a further object of the invention is to provide decoupling spring means for separately connecting each of the string members in opposite senses between the stationary and movable parts of the balance, whereby the increase in tension of one member is compensated for by a decrease in tension of the other member. While dual string type apparatus are well known per se in the prior art (as evidenced, for example, by the Swiss Pat. Nos. 447,653 and 492,961), normally both strings are connected with the pan carrier member via a common coupling element. The use of a single equalizing or damping spring acting upon one string merely for damping the movement of the scale is, of course, known in the art as taught by the Swiss Pat. No. 474,752, Tests with two-string systems have shown that with the aid of the decoupling means of the present invention, considerably more stable frequencies are produced. A gain of time was also found due to the fact that even when the initial oscillation of the load-absorbing means, for example a mass gauge, has not been completed, the measuring result is stable already after a short period of time. The best results may generally be obtained when the elastic members are directly connected to one end of the respective string.

Basically, it can be stated that the decoupling will be progressively more effective, the softer or smoother the elasticity or spring action. As an approximation, the degree of the decoupling increases proportionally to the ratio between the spring constants of the string and the respectively coordinated elastic member.

Preferably at least one of the elastic members includes means for adjusting the spring constants. This renders possible a setting or control of the modulation of the strings, i.e. the distribution of the force to the individual strings. Particularly favorable conditions will arise when the strings are imparted also their prestress at least partially by elastic forces since, in this case, the disturbing influence of external oscillations is considerably smaller than is the case with the use of prestress masses.

In accordance with another feature, it may be expedient to subdivide at least one of the decoupling spring means into two partial springs. This affords the possibility of achieving a particularly accurately acting adjustment of the sensitivity of the device as well as of the transmission ratio of the string stress (i.e., the modulation of the individual strings).

As the requirements regarding the accuracy of the instruments increase, detrimental temperature influences on the string frequency must be taken into consideration, even though the influences or actions of thermal disturbances on the behavior of the coupling springs are relatively small (for example when working with the quotient of two string frequencies). In instruments of the type outlined and described above, in other words, in instruments having an elastic coupling of the string to the load-absorbing means, particularly simple and effective possibilities of compensation are produced. Thus, a further embodiment of the present invention is characterized in that assigned or coordinated to the strings are additional, preferably elastic, correcting members which serve for the purpose of compensating for temperature influences that might adversely affect the function of the strings.

Other objects and advantages of the present invention will become apparent from a study of the following specification when viewed in the light of the accompanying drawing in which.

In the following specification, the letter "$p$" represents a unit of force, "1 $p$" being defined as the force exerted by a mass of 1 gram under the influence of the normal gravitational acceleration of 9.81 m/s². Consequently, $p$ is the equivalent of the term "$g$" as used as a measure of weight.

Figure 1:
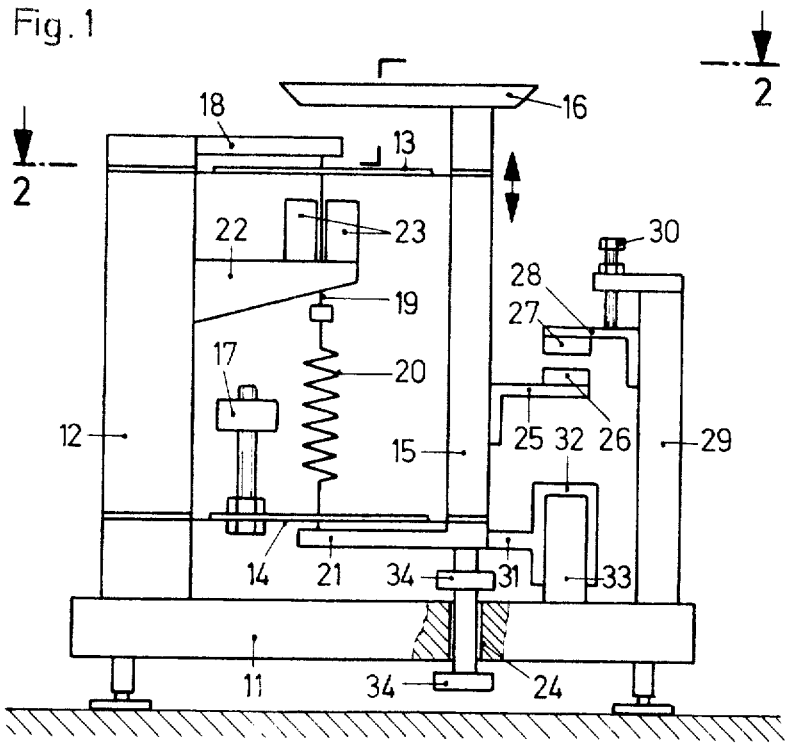
FIG. 1 is a diagrammatic side elevation view of a first embodiment of the force-measuring apparatus including a top-pan single string balance with parallel guide means.
Figure 2:
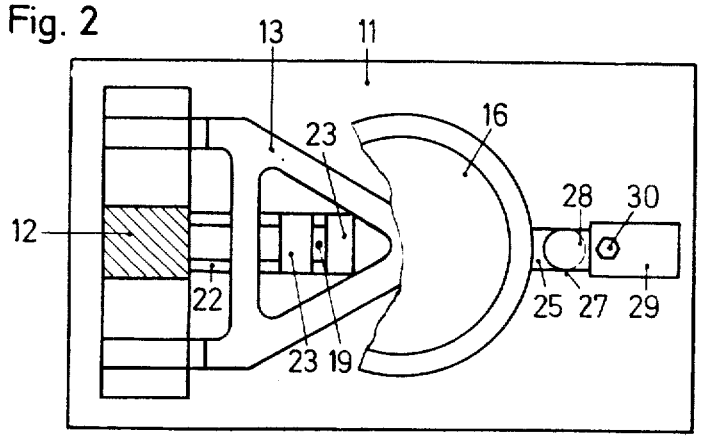
FIG. 2 is a sectional view taken along line 2—2 of FIG. 1.

The balance illustrated in FIGS. 1 and 2 includes a base plate 11 on which a vertically upwardly projecting carrier 12 is mounted. Carried by and guided parallel to the carrier 12 by means of two triangular links 13 and 14 made of resilient material for example, spring bronze, is a pan carrier 15 carrying at its upper end a weighing pan 16. The carrier 12, pan carrier 15 and links 13 and 14 are connected by screws (not shown). Mounted on the lower link 14 is a vertically adjustable sensitivity-adjustment weight 17.

Fixedly connected at its upper end with a cantilever arm 18 rigidly secured to the carrier 12 is a tensioned measuring string 19 the lower end of which is connected via a linear helical spring 20 with a projecting portion 21 of the pan carrier 15. The spring 20 serves to transmit the force to be measured to the string, to decouple the string from the movable portion of the balance, and to protect the string from overloading.

Another bracket 22 on the carrier 12 is used to mount a conventional excitation and sensing head 23 which in known manner initiates oscillation of the string 19, detects the particular string frequencies produced, and transmits them to electronic evaluation means of the balance (not shown).

Secured to the pan carrier 15 is a bracket 25 on which is adhesively secured a round permanent lower magnet 26. An upper permanent magent 27 of identical size is carried by a cantilever arm 28 which in turn is fixedly connected to a column 29 projecting upwardly from the base plate 11. The magnets 26 and 27 are arranged in a repelling manner with like poles opposite each other. The cantilever arm 28 comprises spring bronze so that the magnet 27 can be adjusted vertically by means of an adjusting screw 30.

Projecting from the pan carrier 15 adjacent the lower end thereof is another cantilever arm 31 which at its free end carries an aluminum lug 32. Carried on the base plate 11 are two laterally spaced permanent magnets 33. The lug 32 dips with clearance into the gap between the magnets 33, and thus the assembly of lug 32 and magnets 33 defines eddy current brake means for retarding movement of the pan carrier 15.

The pan carrier 15 includes a lower portion that extends through the opening 24 contained in base plate 11, which lower portion carries the double-acting abutment means 34 that prevent excessive loading of the string 19 and the parallel guide means 13 and 14 when the balance is excessively loaded or excessively relieved of load (the latter resulting in upward movement of the pan carrier).

The string balance illustrated has an initial pre-load (i.e., the weight of the suspension means) of 1700 $p$ and a weighing range of 100 p. The string operates over the weighing range with an initial frequency of 16 kHz and a terminal frequency of 16.4 kHz, thereby providing a 400 Hz signal change corresponding to the weighing range of 100 $p$. In this control range the curvature of the frequency-load characteristic curve (FIG. 11$a$) gives a maximum non-linearity of about 1.3 Hz, which is now virtually completely eliminated by the variable force produced by the two magents 26 and 27. When the balance load is zero, the like poles of the magnets 26 and 27, which are arranged opposite each other, act on each other with a repelling force of 60 $p$, that is to say, 60 $p$ of magnet force are included in the pre-load or basic load. This magnet force can be adjusted by rotating the adjusting screw 30, that is to say, by varying the distance between the two magnets.

With a load of 50 $p$ (halfway on the weighing range), the links 13 and 14 are horizontal (i.e., they do not exert any restoring force). When the weighing pan 16 is loaded with a load P, the system is deflected. The string is put under greater tension, the links 13 and 14 exert, with respect to the horizontal, a restoring force which varies virtually linerarly, and the repelling magnet force is reduced, the magnetic force curve being non-linear due to the known inverse proportionality of that force to the square of the distance.

Over the weighing range of 100 $p$, the restoring force of the links 13 and 14 changes approximately from +3.5 to −3.5 p, and the magnetic force is reduced to about 48$p$, therefore the increase in force on the string is around 81$p$. In accordance with the present invention, owing to the non-linear reduction in magnetic force resulting from the application of load to the pan carrier, there is achieved a relative non-linearity of only about $\pm 5.10^{-5}$ in the relationship between the load to be weighed and the change in frequency over the weighing range in question. The total distance covered by the pan carrier 15 in a vertical direction is only about 0.5 mm; however, if other means for linearization (as referred to below) are used, a substantially larger distance must generally be covered.

Since the electronic system of the balance (excitation means, pick-up means, evaluation means and means for representing the result) is in accordance with known principles (see, for example, VDI Journal 1956, Vol. 98, No. 26, pages 1541$ff$), and is not the subject of this invention, further illustration thereof has been omitted.

Referring now to FIGS. 3 to 11, other alternate embodiments of the force-exerting means of the present invention have been illustrated, the same reference numerals as in FIGS. 1 and 2 being used to indicate like elements.

Figure 3:
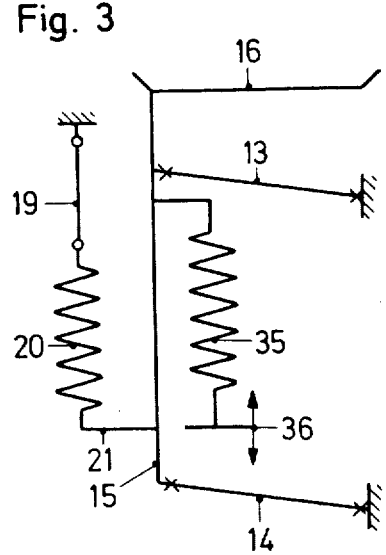
FIGS. 3 to 10 are diagrammatic views of other embodiments each having one measuring string.

In FIG. 3, a non-linear helical spring 35 is connected at its upper end with the pan carrier 15 and is loaded in tension to produce the linearizing compensating force. The lower end 36 of the spring 35 is adjustably connected with the fixed portion of the force-measuring apparatus to permit adjustment of the non-linear interference force. By varying the spring constant of the connecting spring 20 in a known manner, it is also possible to vary the degree of linearization by means of the varying control of the non-linear spring which can be achieved in this way. By appropriate selection of the spring constant, it is possible to provide substantial compensation for the interference influence of the non-linear members in second and third positions of the above stated exponential series.

Figure 4:
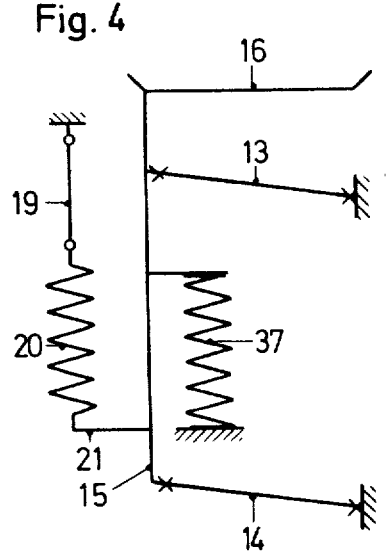

In the embodiment of FIG. 4, the non-linear helical spring 37 is compression-loaded and functions in the same manner as the embodiment of FIG. 3.

Figure 5:
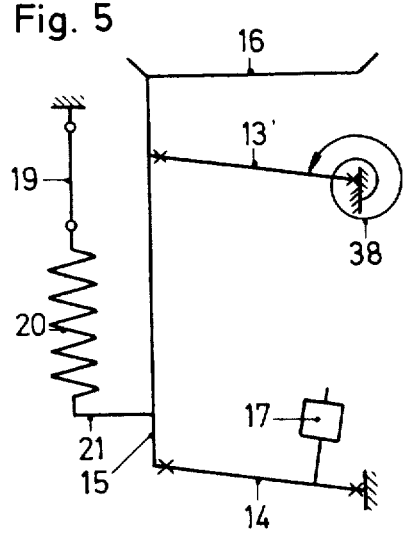

Referring now to the embodiment of FIG. 5, the spiral spring 38 applies to the movable part of the apparatus a non-linear variable force which acts in a vertical direction. A similar effect can be achieved with a helical spring that is loaded in bending moment. At least the upper link 13' of the parallel guide means is advantageously rigid in both cases.

Figure 6:
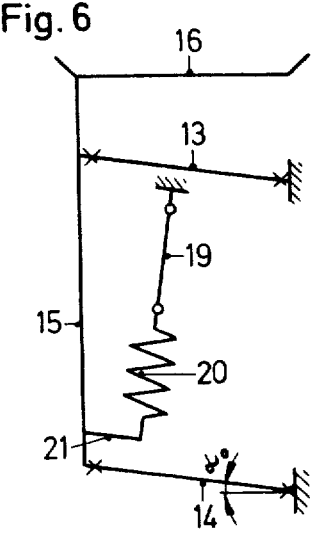

FIG. 6 illustrates a construction in which the linearization action is achieved by means of the weight of the movable portion on a non-linearly increasing lever arm. When the system of pan carrier 15 and pan 16 is deflected from its initial position ($\alpha$ substantially greater than 0), the direction of pull of the connecting spring 20 varies only little, while the effective lever arm of the weight of the movable portion varies relatively strongly non-linearly. Thus, the desired non-linearity is produced in the transmission of the force to be measured to the string. The angle $\alpha$ preferably always remains considerably greater than 0 in the weighing range.

Figure 7:
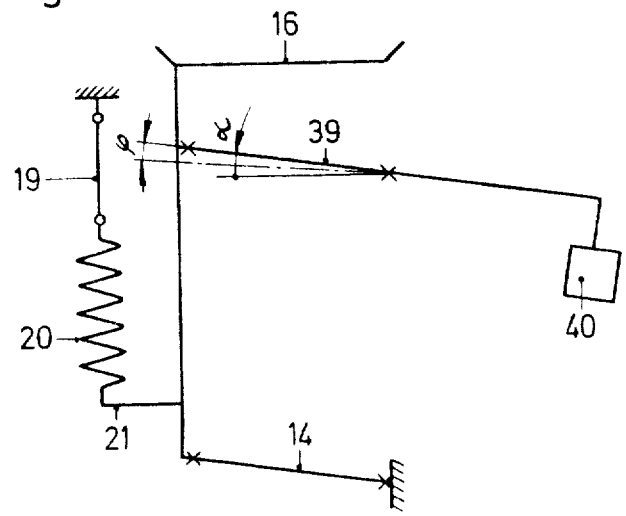

FIG. 7 shows another alternative embodiment in the form of a beam balance with beam 39 and counterweight 40. Here the movement of the beam 39 produces the linearization effect, in accordance with the known tangent function. As in the embodiment shown in FIG. 5, the angle of inclination $\alpha$ should not become less than 0; the range of deflection $\psi$ selected and the position of the center of gravity of the balance beam 39 determine the degree of linearization.

Figure 8:
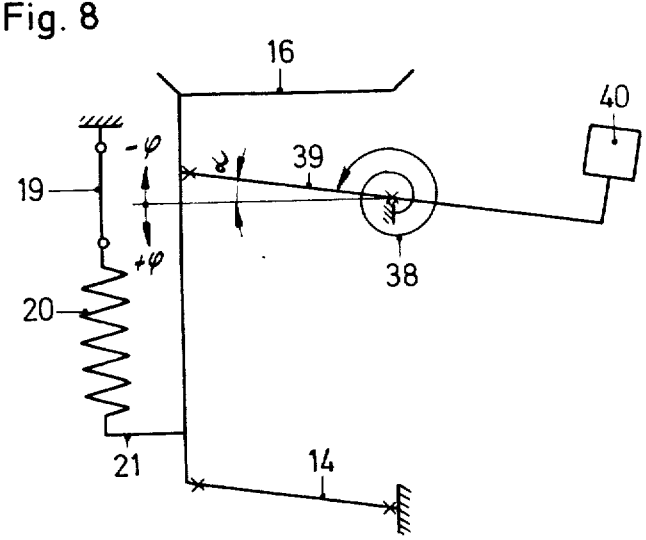

FIG. 8 shows a construction which in substance is a combination of the embodiments shown in FIGS. 5 and 7. It represents another possible way of applying interference forces for compensating for the square and possibly the cubic member of the above stated exponential series representing the frequency-load function. In this case, deflection of the movable system (15, 16, 39 and 40) symmetrically relative to the horizontal serves to produce an interference force for compensation of the cubic member.

The embodiment shown in FIG. 7 has a stably adjusted balance beam which reduces the weighing load applied to the string. In many cases it may be advantageous for the counterweight 40 to be arranged above the beam, as in FIG. 8, in such a way that there is unstable adjustment and the weighing load acting on the string is increased.

Figure 9:
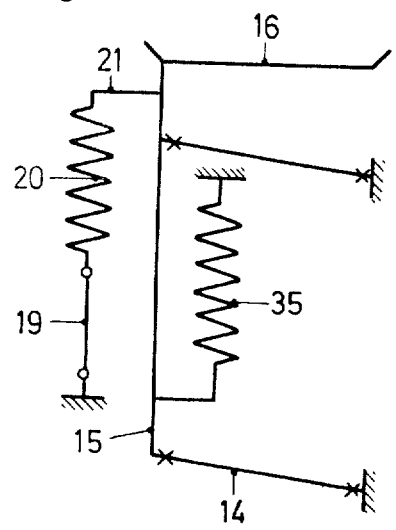

FIG. 9 shows a reversal of the embodiment shown in FIG. 3, insofar as the string frequency produced in this construction decreases as the force to be measured increases.

Figure 10:
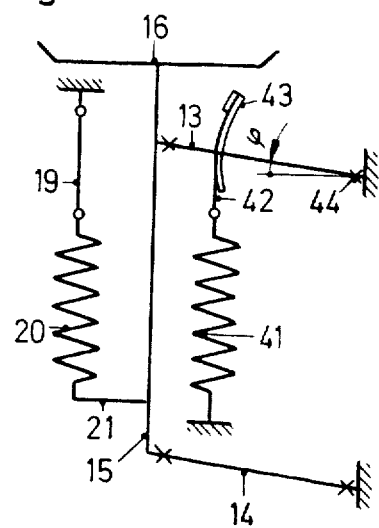

According to the embodiment illustrated in FIG. 10, a linear helical spring 41 loaded in tension acts on the upper link 13 by way of a traction strip 42. The traction strip 42 is secured to an arcuate holder 43 the radius of which is measured from the pivotal mounting point 44 of the link 13, so that the strip 42 produces a linearly decreasing moment on the link 13. Depending on the cosine of the angle of inclination, this moment produces an interference force which acts on the suspension means in the direction of the force to be measured. The linearizing correction action follows from the variation in this interference force in dependence on the vertical movement of the movable portion.

Other possibilities similar to the construction shown in FIG. 10 are apparent, for example the spring 41 can be replaced by a parallel-guided vertically movable weight.

Figure 11A:
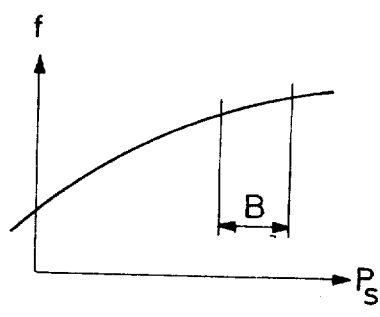
FIGS. 11a and 11b illustrate the principle of the frequency-load characteristic curve and the individual force curves of the embodiment shown in FIG. 1.
Figure 11B:
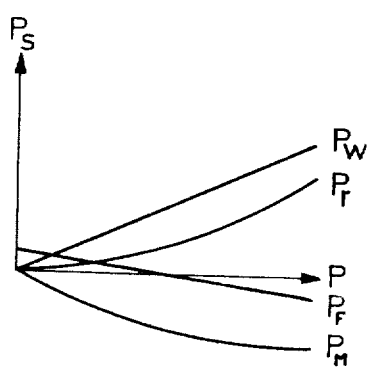

Finally, FIG. 11a illustrates the characteristic non-linear dependency of string frequency $f$ on string force $P_s$, the reference B indicating the control region (i.e., the measuring range), while FIG. 11b qualitatively illustrates the cooperation of the forces of the arrangement shown in FIGS. 1 and 2. As illustrated in FIG. 11b, the load being weighed $P_W$ rises linearly from 0 to 100 p, while at the same time and also linearly, the restoring force $P_F$ of the parallel guide means varies from $+3.5\ p$ to $-3.5\ p$ (oppositely to the weighing load, therefore decreasing). Also decreasing, but non-linearly, is the interference force $P_M$ produced by the magnets, giving the resultant force curve $P_r$, which represents the non-linear change in the string force $P_s$.

Figure 12:
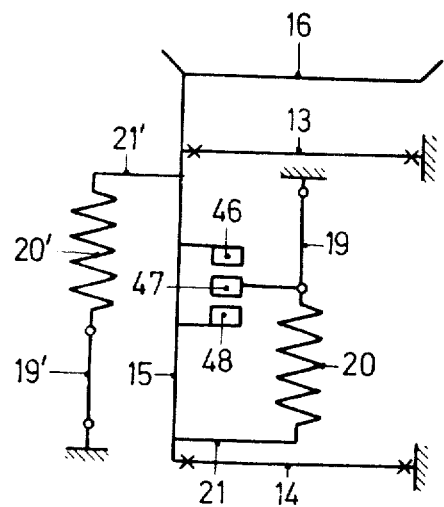
FIG. 12 is a diagrammatic illustration of a magnetically compensated embodiment including two measuring strings.

FIG. 12 illustrates the use of linearization means in a string balance with a pair of strings 19, 19'. When the weighing pan 16 is loaded, the tension in the string 19 is increased, while that in the string 19', which is of identical construction to the string 19, is reduced. The basic load of the arrangement can be accomplished substantially by making the links 13 and 14 in the form of springs with suitable resistance to bending or by providing an upwardly acting tension spring (not shown) acting on the cantilever arm 21'. Accordingly, the two frequency-load characteristic curves move in opposite directions, the curve of the string 19 rising with increasing load, and the curve of the string 19' falling with increasing load. The common evaluation of the two changes in frequency, forming the frequency differences $f_1 - f_2$, produces an already substantially linear dependency on the change in force, as the two quadratic parts of the non-linearities cancel each other out. The non-linearities of the third order are compensated by the arrangement of magnets 46, 47 and 48.

Another advantage of the arrangement illustrated in FIG. 12 is generally that, owing to the two connecting springs 20 and 20' moving parallel to each other in opposite directions, the corner load error of the balance, that is to say, any weighing error due to the material to be weighed not being positioned centrally on the weighing pan, is smaller by at least one power of ten than is the case, for example, in an arrangement with strings arranged one behind the other, or an arrangement with only one string.

As can be shown by calculation, the quadratic components of the non-linearity precisely disappear in the case of two-string arrangements as described above, when the transmission ratio of the string tensions, which are varied in opposite directions by the force to be measured, is selected as $-1$ (when operating with a frequency difference $f_1-f_2$) or $-\frac{1}{3}$ (when operating with a frequency quotient $f_1/f_2$).

While a transmission ratio of $-1$ can be readily achieved with the arrangement described above with reference to FIG. 12, this is not the case with a ratio of $-\frac{1}{3}$. Arrangements are in fact already known which produce the relation $-\frac{1}{3}$. However these are mostly relatively expensive constructions in which, for example, levers are used for producing the ratio of transmission.

In another aspect of the invention, using simple means, any desired transmission ratio, in particular $-\frac{1}{3}$, can be achieved, in a two-string arrangement as described above, by the two strings being connected to the movable portion of the force-measuring apparatus via springs having different spring constants. Thus, instead of the above described identical connecting springs 20 and 20' (FIG. 12), springs with different spring constants are now used. If, for example, the transmission ratio selected is $-\frac{1}{3}$, the spring constant of the spring 20 must be three times as great as that of the spring 20'.

Also, depending on the criteria of the individual case, any other desired transmission ratios can be achieved by suitable design of the connecting springs.

An embodiment with a measuring range of 100 $p$ was described hereinbefore. This measuring range can be enlarged in known manner, for example, by means of switchable weights. In addition, however, control of string is not limited to a small range of this kind, but can be increased by suitable selection of the individual parameters, for example to 1,000 $p$, without it being necessary to resign a linearity of at least $10^{-4}$. Combination forms with separate compensation of the square and the cubic interference members are preferably suited for this purpose.

The arrangement described with reference to FIGS. 1 and 2 has resilient parallel links 13 and 14. In principle however, rigid links, for example links mounted on a knife edge, can also be used, and in some cases are even to be preferred.

The incorporation of taring means, for example in the form of taring springs, is basically readily possible.

Other uses of linearization means according to the invention in apparatuses without parallel guide means, which use strings, are for example travel measuring means similar to the embodiment shown in FIG. 3, or angle measuring means similar to the embodiment shown in FIG. 5.

The case described at the beginning of this specification was that which occurs most frequently, namely when the force-exerting means according to the invention is used for linearization of the frequency-load characteristic curve. Other uses are however also possible, in which the curvature of the characteristic curve is only slightly corrected (increased or reduced). For example, in the case mentioned above of through-flow measurement, a virtually precise quadratic curve can be produced by suitable use of the above described force-exerting means.

Even when using only one string for a selected measuring range, the above described force-measuring apparatus has a frequency force characteristic curve which, within the required degree of measuring precision, is linear. With this condition fulfilled, evaluation and representation of the measuring results are quite substantially simplified. It is now possible to pick up the measuring value and represent it digitally by direct counting of the string frequency (for example, by means of a quartz oscillator).

FIG. 13

Figure 13:
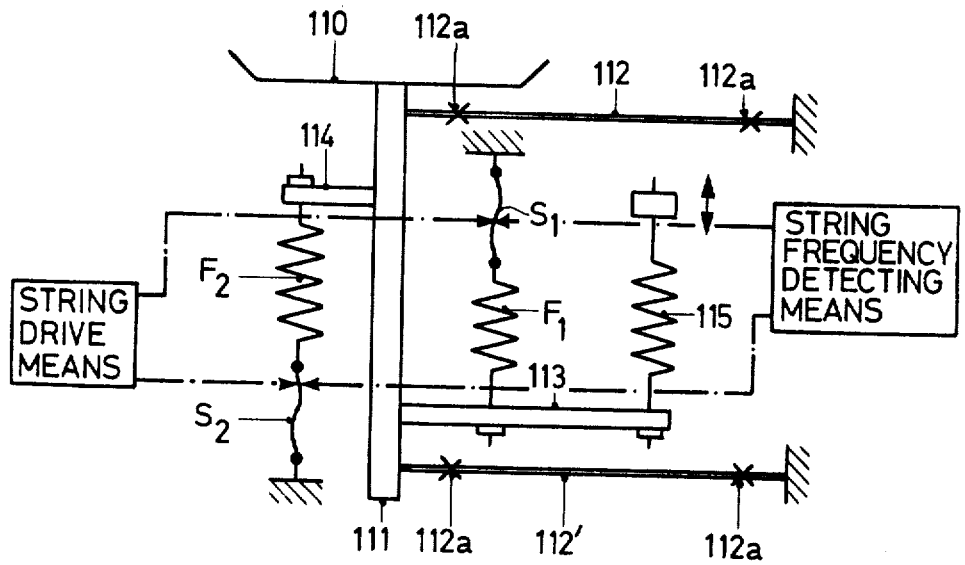
FIG. 13 is a diagrammatic illustration of a two-string embodiment without magnetic compensation.

Referring now to FIG. 13, a two-string embodiment is disclosed in which the magnetic compensation means of FIG. 12 is eliminated, said apparatus including a pan 110 supported on a carrier 111. Parallelogram guide means are provided including a pair of control levers 112, 112' which connect the carrier 111 with the rigid or stationary part of the balance (i.e., the balance frame). The control levers are, for instance, flat springs equipped with bending points 112a. Disposed at a first arm 113 on carrier 111 is a tension spring $F_1$ to the upper end of which is secured a first string $S_1$. The upper end of this string is rigidly connected with the frame.

On a second arm 114 of the pan carrier acts a similar arrangement consisting of a tension spring $F_2$ and a string $S_2$, the latter being again rigidly connected at one end with the frame.

It is further possible that disposed at the arm 113 is an additional tension (i.e., taring) spring 115 whose upper end comprises an adjusting means for either increasing or decreasing the tension by either tightening or loosening the spring (which has been indicated with the aid of the vertical double arrow). The taring spring 115 serves to support the basic load and, if desired, for compensating dead weights.

During the weighing operation, the tension in the string $S_1$ is increased in a manner known per se and that in the string $S_2$ is decreased. At that time, the springs $F_1$ and $F_2$ bring about—in addition to the transmission of force to the strings and in addition to the elastic absorption of the deflection of the pan 110 and carrier 111 under the load—the afore-mentioned disconnection or uncoupling with respect to oscillation of the strings, both with respect to each other, and with respect to the movable pan and carrier components (110-114) of the balance. They further render possible—depending upon and in accordance with the choice of the spring constants—an influence on the modulation of both strings, in other words, of the load distribution. Further possible with the aid thereof is a setting of the prestress force as well as an additional control of the inherent/frequency of the strings by selecting a corresponding characterizing curve of the springs.

Customarily used for the evaluation is either the difference or balance of the two string frequencies ($f_1 - f_2$), or the quotient thereof ($f_1/f_2$).

If the frequency difference is utilized for operation, the use of two identical coupling springs ($F_1$, $F_2$) produces and results automatically in the transmission ratio of $-1$ which is ordinarily preferred for reasons of linearity.

If the frequency quotient is used instead, the transmission ratio of $-\frac{1}{3}$ is sought to be attained customarily for the same reason as given above. In this case, the spring constants $c_1$ and $c_2$ must behave like 3:1.

When the modulation of the strings is indended to be varied or finely and precisely adjusted, the use of a screw head, for example, in one of the two coupling springs is expedient—particularly in cases deviating from $-1$ (difference) or $-\frac{1}{3}$ (quotient—and with the aid thereof the spring constant may be varied, as is known in the art.

It is expedient to use strings from alloys having a constant modulus, i.e. those in which temperature variations will not have an appreciable effect upon the oscillation behavior. If, on the other hand, for example the elasticity modulus of the string material has a high temperature coefficient, it is advantageous to have the basic load absorbed largely by the taring spring 115; as a result thereof, the accuracy regarding the measurements within the operating area will be less markedly affected.

FIG. 14

Figure 14:
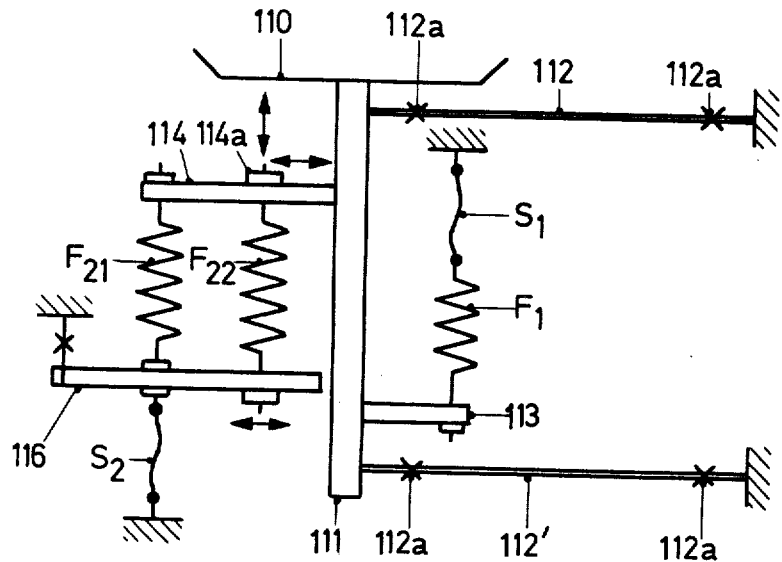
FIG. 14 illustrates another two-string embodiment including a pair of tension springs one of which is further subdivided into a pair of partial springs the tension of one of which is adjustable.
Figure 15:
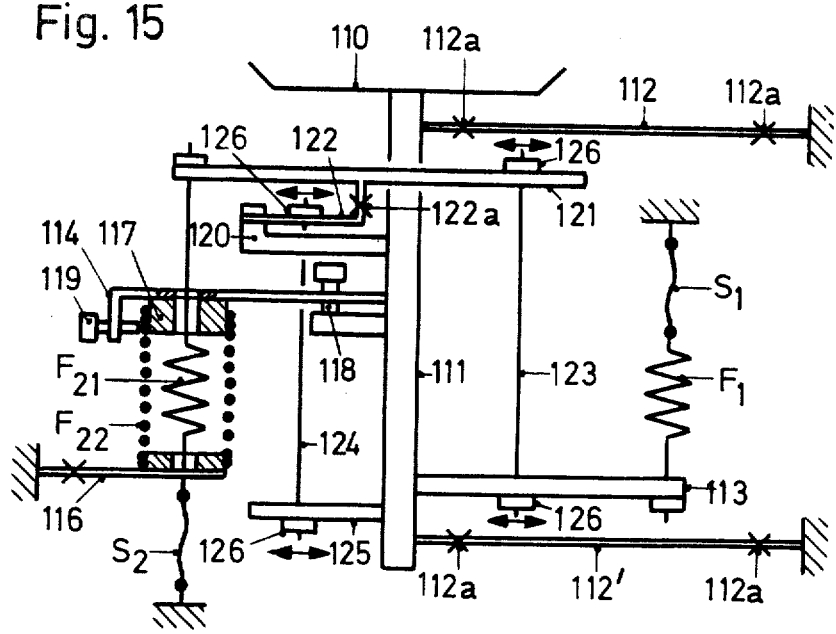
FIG. 15 illustrates a temperature-compensated two-string embodiment including a pair of tension springs one of which is divided into a pair of concentrically arranged partial springs.
Figure 16:
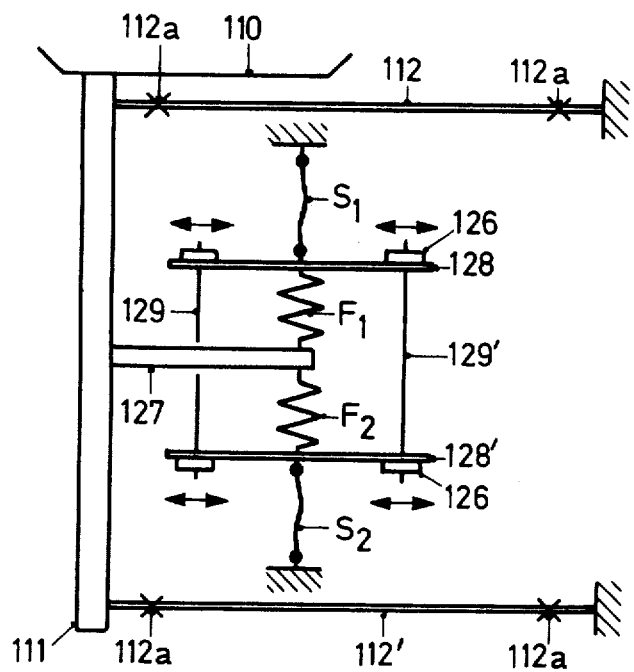
FIG. 16 illustrates a temperature-compensated two-string embodiment wherein the strings and the associated tension springs are connected with the pan carrier by a common arm.

In the embodiment shown in FIG. 14, the spring means $F_2$ comprises two partial springs $F_{21}$ and $F_{22}$. (It is understood that the spring F could also be subdivided instead, and that, if desired, both springs may be so subdivided.) The apparatus includes an arm 116 which is pivotally connected at one end with the frame and which, on the one hand, is connected with the coupling between string $S_2$ and the partial spring $F_{21}$ and, on the other hand, with one end of the partial spring $F_{22}$. The other end of the partial spring $F_{21}$ is connected with arm 114. The two ends of the spring $F_{22}$ with respect to the arm 114 and the arm 116 are horizontally adjustably disposed with the aid of known means to effect variation of the modulation ratio. Furthermore, the upper end of this spring is provided with an adjusting means 114 (not shown in further detail) for varying the extension of the spring (as shown by the vertical double arrow) in order to precisely adjust the sensitivity or responsiveness. A suitable dimensioning will result, in the case of working with the frequency quotient, for example from the choice of the spring constant of $c_{21}$ and $c_{22}$ at a ratio of approximately 8:1, in which case the ratio of the spring constants of $c_1$ to $(c_{21} + c_{22})$ depends again upon the choice of the transmission ratio (for example —⅓).

A significant advantage of this arrangement consists in that, by virtue of the subdivision of a coupling spring into relatively strong and relatively weak partial springs, a convenient possibility for the fine adjustment of the sensitivity as well as the modulation ratio is attained.

The possibility of adjusting the modulation ratio by varying the arm exists also when an undivided spring $F_2$ is employed.

Figure 15

This embodiment differs from FIG. 14, first of all, because of the fact that the two partial springs $F_{21}$ and $F_{22}$ are concentrically disposed, which results in a particularly compact arrangement. The partial springs have here again varying degrees of resiliency at a ratio of approximately 8:1 ($c_{21}:c_{22}$). For adjusting the modulation ratio in this case a screw head 117 is provided for varying the spring constants of the partial spring $F_{22}$. The screw head—and therewith the upper end of the spring $F_{22}$—are adapted to be adjusted with respect to height by means of the adjusting device 118 so that a fine adjustment of the sensitivity be obtained. A setscrew 119 locks the spring in position on the screw head.

A further difference with respect to the embodiment described above resides in the provision of means for compensating for temperature influences. An arm or crossbar 120 is rigidly connected with the carrier 111 and has a stiff flat spring 122 screwed thereon. Pivotally connected thereto (bending point 122a) is a beam 121. Mounted at one end of the beam 121 is the upper end of the spring $F_{21}$, and rigidly secured to the other end thereof is a wire 123 whose lower end is connected with the rigid arm or crossbar 113. A further wire 124 is attached on the one hand to the leaf-type or flat spring 122 and, on the other hand, via an arm 125, to the carrier 111. The wires 123 and 124 are displaceably disposed at the clamping points 126 thereof, and thus allow for an adjustment of the effective distances from the pivot point (bending point 122a) of the beam 121.

The wires 123 and 124 act as coupling members which, in cooperation with the coupling springs $F_1$ and $F_{21}$ or $F_{22}$, respectively, bring about a compensation of the influences of temperature variations on the strings as well as the string tension. This is true both in view of stationary temperature conditions and with respect to dynamic disturbances (on the basis of different thermal inertias of the various components). The former as well as the latter can be compensated for nearly completely by a corresponding dimensioning and adaptation of the choice of material, for example in view of the linear extension of the wires 123, 124, and of the coupling springs $F_1$, $F_2$ being due to the temperature, as well as by adjusting the effective distances.

A further possibility of correction with regard to disturbing temperature influences consists in utilizing the linear extension or expansion of the bracket parts, serving for clamping in springs $S_1$, $S_2$, for purposes of the compensation. If, for example, the modulation ratio of both strings is —⅓ corresponding to a spring constant ratio of the coupling springs $F_1$, $F_2$ ($c_1:c_2$) of 3:1, and if by dimensioning and choice of material of the frame parts a ratio of 1:3 of the respective linear expansion in the longitudinal string direction is set or adjusted, no disturbance of the ratio of the string frequency and of the modulation ratio will arise as a consequence of a temperature variation because the disturbing forces due to the temperature which act upon the load-absorbing means (here the parallelogram guide means) mutually compensate, or annul, or cancel each other, and a displacement of the load-absorbing means thus does not take place.

The two modified embodiments described hereinabove (use of temperature compensating members 123, 124, and/or making use of the displacement of the clamping points of the strings on the side of the bracket) apply similarly also to the use in connection with a taring spring (for example 115 in FIG. 13), since a variation of the action of force of the taring spring will modulate both coupling springs, and hence both strings. It is possible to thereby stabilize the zero point of the system with respect to temperature variations.

Figure 16

This embodiment differs from the embodiments described above on the one hand because of the fact that the two partial systems $S_1$, $F_1$ and $S_2$, $F_2$ are directly superimposed with respect to each other and connected with the carrier 111 by way of a common arm 127 (but in general principle the arrangement could equally be made horizontally).

Furthermore, in this case two additional coupling elements (namely, flat springs 128, 128' and wires 129, 129') each are disposed between the two strings. The center portions of flat springs 128, 128' are connected with the coupling points of string $S_1$ and spring $F_1$ and/or string $S_2$ and spring $F_2$, the remote ends of the springs being joined by means of one wire each 129, 129', which wires preferably consist of a material having small longitudinal variations due to temperatures (within the range being practically of interest). The clamping points of the wires are adjustable in the direction of the double arrows for setting the spring constants of the springs.

An increase of the forces in the coupling springs $F_1$, $F_2$ due to heating, and thus resulting shift of the clamping points of the strings on the bracket side is in this case, for example, additionally enhanced due to an increase of the forces in the flat springs 128, 128'. Accordingly a decrease in frequency due to the heating of the strings $S_1$, $S_2$ can be compensated for, and a far-reaching stabilization of the sensitivity of the arrangement is obtained inasmuch as the additionally reinforcing or enhancing force of 128, 128' acts equally and evenly on both strings.

A further modified embodiment (not shown) having an analogous effect can be achieved when the members 128, 128' are provided as stiff or rigid beams and when the wires 129, 129' are replaced by springs (for example buckling springs, spiral springs, or flat springs) having a correspondingly smaller linear extension.

The arrangement described herein renders it possible to effect any desired corrections regarding the external forces acting upon the strings—depending upon and in conformity with the respective conditions or requirements—towards either an increase or a decrease in the case of temperature variations.

Figure 17

Figure 17:
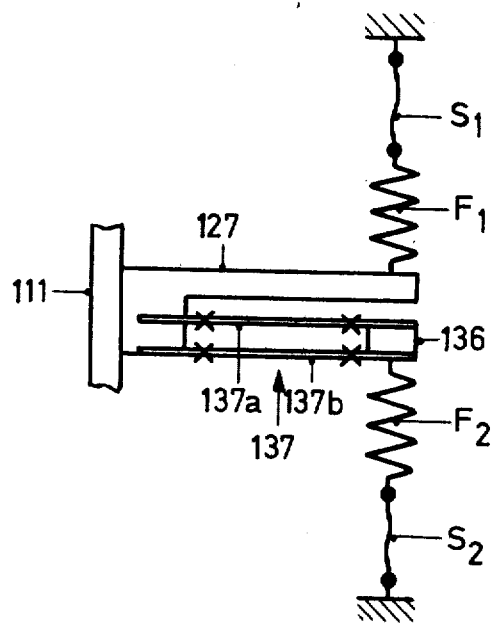
FIG. 17 illustrates a two-string embodiment including bimetallic temperature compensating means.
Figure 18:
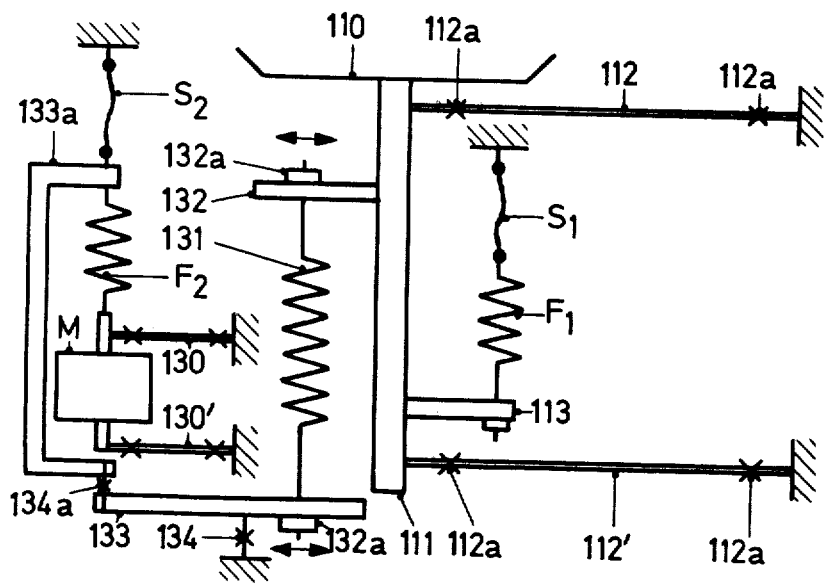
FIG. 18 illustrates a two-string embodiment wherein the strings are pre-stressed by the pan carrier assembly and by a separate mass, respectively.
Figure 19:
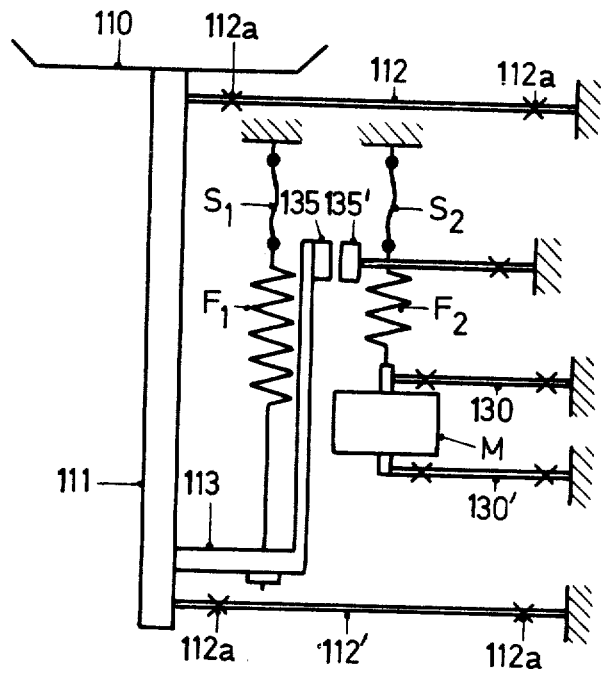
FIG. 19 illustrates another embodiment wherein both measuring strings are arranged on the same side of the pan carrier and FIG. 20 illustrates a two-string embodiment having only a single sinusoidal spring which affords temperature compensation.

Another modified embodiment is illustrated in FIG. 17. In this case a bimetallic double strip 137 is coordinated as the elastic correcting element to a coupling point 136 between the parallelogram guide means and the coupling spring. The double strip 137 consists of a first strip 137a having a small heat expansion and a second strip 137b having a greater heat or thermal expansion. Upon heating, a resultant correcting force will be produced bringing about an increased string tension.

Figure 18

This example illustrates an embodiment of the inventive instrument which is designed for use as mass gauge. It is essential in this csae that the two strings $S_1$, $S_2$ are prestressed here exclusively by masses (i.e., prestress mass M and the mass of the movable pan carrier assembly 110, 111). In this case, the prestress mass M is guided in a parallel manner analogous to the pan carrier 111, by means of unilaterally clamped-in control levers 130, 130'. The two partial systems are coupled by a tension spring 131. The latter acts on the one hand upon an arm 132 of the carrier 111 and, on the other hand, upon a lever 133. The latter is elastically positioned by way of a pivot 134 and provided at its other end with a suspended portion 133a. This suspended portion 133a is connected with the lever 133 by way of a pivot 134a and acts at its upper end upon the coupling point between the string $S_2$ and the spring $F_2$. The spring 131 is here provided in the same manner as the spring $F_1$ and suitably adjustable in the clamping points thereof, such as has been indicated by the double arrows (see in this connection also the description of FIG. 14).

In the case of unequal or uneven springs $F_1$ and 131, the desired transmission ratio for the modulation of the strings may be adjusted at the lever 133.

Figure 19

This embodiment was conceived similarly to the preceding one, but a more compact arrangement has been provided here in that both strings are disposed on the same side of the carrier 111.

A characteristic for this embodiment, moreover, is the absence of a mechanical coupling between the two partial systems, in that the coupling is established by way of two permanent magnets 135, 135' which influence the modulation of the strings. The corresponding poles facing each other exert at that time a repelling force with respect to each other, which increases with the growing correspondingly limited deflection of the carrier 111 from the zero position. The vertical component, used here for purposes of the coupling, of the magnetic force thereby becomes superimposed to the weighing load.

Figure 20

It may be advantageous to adjust the guide of the loadabsorbing means indifferently, in other words for example to eliminate the spring constant of a parallel guide or construction. As a result thereof, it will no longer exert any influence on the coupling spring forces during temperature variations, and these will therefore change in precisely the same degree. The same holds true for the spring constant of a possibly provided taring sring.

Figure 20:
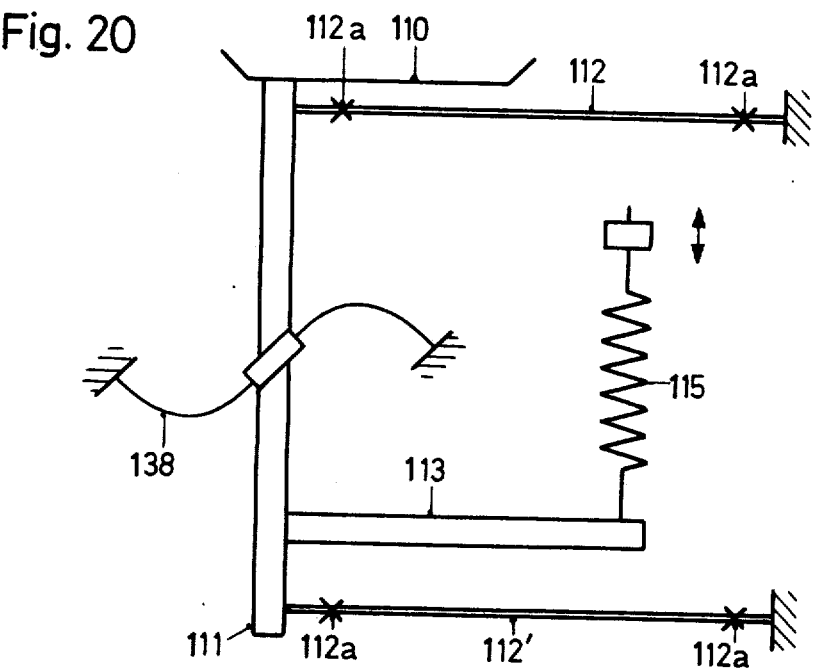

One possibility therefor is the use of a sinusoidal spring, i.e. a flat spring 138 being sinusoidally prestressed, which is clamped in at the two ends on the frame side and in the center is connected with the carrier 111. It has a negative spring constant which may just about compensate that of the parallel guide 112, 112' as well as that of the taring spring 115 (the other details of FIG. 20—including the two strings $S_1$ and $S_2$—correspond to those of one of the other figures and were therefore not repeated in this connection).

An additional possibility (not shown) consists for example in the use of a magnetic system for purposes of eliminating the spring constants.

The inventive instrument is characterized by a practically total absence of noise or extraneous resonances, as well as interferences which could be initiated in case of a faulty mutual disconnection or uncoupling between the two strings with the same rated frequencies due to minor deviations. The uncoupling or disconnection which is achieved results in a stability of the frequencies which—compared to the prior art systems—is many times greater. The present invention further makes it possible, with the aid of the properties of the coupling springs, to build up with relatively simple means compensating forces for compensating for temperature variations.

Even though generally devices or instruments with two oscillating strings are used, the advantages afforded by the present invention have validity in principle also for instruments having three strings, for example.

In the embodiments shown, the arrangement of the strings and springs has been shown to be vertical throughout, in conformity with the arrangements that are customarily used. However, horizontal arrangements are equally feasible, if necessary, for example for dynamometers.

Further fields of application of the inventive instrument are for example analyzers for platform balances, or torque indicators.

While in accordance with the provisions of the Patent Statutes, I have illustrated and described the preferred forms and embodiments of the invention, it will be apparent that various changes and modifications may be made without deviating from the inventive concepts set forth above.

What is claimed is:

1. Force measuring apparatus of the type including at least one oscillatory string the frequency of oscillation of which affords an indication of the magnitude of a load to be measured, comprising
   a. a stationary frame member;
   b. a movable pan carrier member connected for vertical movement between normal no-load and full-load positions relative to said frame member;

c. oscillatory string means connected under tension between said frame and pan carrier members, said string means including at least one string member connected at one end with one of said frame and pan carrier members, and a spring member connecting the other end of said string member with the other of said frame and pan carrier members; and d. compensating means for applying a corrective force on said string to compensate for the non-linearity of said string and spring members throughout the entire range of travel of said pan carrier member between said no-load and full-load positions, said compensating means comprising a second string member, and a decoupling spring member independently connecting said second string member between said pan carrier and said frame members in an opposite sense than said one string member, respectively, whereby the tensions of said string members are correspondingly increased and decreased, respectively, upon the application of the load to said pan carrier member.

2. Apparatus as defined in claim 1, and further including temperature compensation means for compensating for variations in the length of said string and spring members as a function of temperature.

3. Apparatus as defined in claim 1, wherein said compensating means includes means (46, 47, 48) for applying to said oscillatory string means a correcton force that varies cubically with the displacement of said movable member from said no-load position toward said full-load position.

4. Force measuring apparatus of the type including at least one oscillatory string the frequency of oscillation of which affords an indication of the magnitude of a load to be measured, comprising a. a stationary frame member;

b. a movable pan carrier member connected for vertical movement between normal no-load and full-load positions relative to said frame member;

c. oscillatory string means connected under tension between said frame and pan carrier members, said string means including at least one string member connected at one end with one of said frame and pan carrier members, and a spring member connecting the other end of said string member with the other of said frame and pan carrier members; and d. compensating means for applying a corrective force on said string to compensate for the non-linearity of said string and spring members throughout the entire range of travel of said pan carrier member between said no-load and full-load positions, said compensating means including magnet means for applying to said movable member a repelling magnetic force biasing said movable member toward said full-load position, whereby upon displacement of said movable member, under load, toward said full-load position, the magnetic biasing force decreases in inverse proportion to the square of the displacement distance.

5. Force measuring apparatus of the type including at least one oscillatory string the frequency of oscillation of which affords an indication of the magnitude of a load to be measured, comprising a. a stationary frame member;

b. a movable pan carrier member connected for vertical movement between normal no-load and full-load positions relative to said frame member; and c. oscillatory string means connected under tension between said frame and pan carrier members, said string means including 1. a pair of string members each connected at one end with one of said frame and pan carrier members, respectively; and 2. at least two spring means independently connecting the other ends of said string members with the corresponding frame and pan carrier members, respectively, said string members being connected in the opposite sense relative to said pan carrier member to cause the tensions in said string members to be increased and decreased, respectively, upon the application of load to said pan carrier member.

6. Apparatus as defined in claim 5, and further including temperature compensating means for applying to at least one of said strings a corrective force for compensating for temperature-responsive variations in the properties of said string members and said spring means, respectively.

7. Apparatus as defined in claim 6, wherein said string members and the corresponding spring means are arranged on opposite sides of, and are connected with, a lateral extension (127) of said pan carrier member, and further wherein said temperature compensating means comprises a pair of flat springs (128, 128') the intermediate portions of which are connected with the junctions between said string members and the corresponding spring means, respectively, and a pair of temperature-responsive wire elements (129, 129') connected between the free ends of said flat springs, respectively.

8. Apparatus as defined in claim 7, wherein said string members and the corresponding spring means are arranged on opposite sides of, and are connected with, a lateral extension (127) of said pan carrier member, and further wherein said temperature compensating means comprises a pair of rigid beams the intermediate portions of which are connected with the junctions between said string members and the corresponding spring means, respectively, and a pair of springs connected between the free ends of said beams, respectively.

9. Apparatus as defined in claim 6, wherein said string members and the corresponding spring means are arranged on opposite sides of a lateral extension (127) of said pan carrier member, and further wherein said temperature compensating means comprises temperature-responsive bimetallic means (137) connecting one end of at least one of said string members with said lateral extension.

10. Apparatus as defined in claim 6, wherein said temperature compensation means comprises a sinusoidally prestressed flat spring (138) the end portions of which are connected with said frame member and the central portion of which is connected with said pan carrier member, said sinusoidal spring having a negative spring constant.

11. Apparatus as defined in claim 5, and further including means for adjusting the spring constant of at least one of said spring means.

12. Apparatus as defined in claim 5, wherein at least one of said spring means comprises a pair of partial springs ($F_{21}$, $F_{22}$).

13. Apparatus as defined in claim 12, wherein the partial springs have different dimensions.

14. Apparatus as defined in claim 13, wherein said partial springs comprise a first partial spring, and a coiled second partial spring arranged concentrically about said partial spring.

15. Apparatus as defined in claim 12, wherein said partial springs are each connected at one end with said pan carrier member, a lever (116) connecting the other ends of said partial springs with the corresponding string ($S_2$), and further including means pivotally connecting said lever with said frame member.

16. Apparatus as defined in claim 15, and further including means (14a) for adjusting the tension of one of said partial springs.

17. Apparatus as defined in claim 15, wherein said partial springs have different degrees of resiliency.

18. Apparatus as defined in claim 15, wherein one of said partial springs comprises a coil spring arranged concentrically about the other of said partial springs.

19. Apparatus as defined in claim 18, and further including temperature compensation means for compensating for the differences of temperature on said string members and said string means, said temperature compensating means being connected between said pan carrier member and said one end of said partial springs and comprising
   a. a flat spring (122) connected at one end with said pan carrier;
   b. a lever (121) pivotally connected intermediate its ends with the other end of said flat spring, said lever being connected at one end with said partial spring means;
   c. a first temperature-responsive wire (123) connected at one end with the other end of said lever, said first wire extending parallel with the direction of movement of, and being connected at its other end with a first lateral extension (113) on, said pan carrier member; and
   d. a second temperature-responsive wire (124) connected at one end with an intermediate portion of said flat spring, said second wire extending parallel with the direction of movement of, and being connected at its other end with a second lateral extension (125) of, said pan carrier member.

20. Apparatus as defined in claim 5, and further including additional spring means (131) connected between one of said spring means and said pan carrier member.

21. Apparatus as defined in claim 5, and further including magnetic means (135, 135') for applying to said pan carrier member a correction force that varies with the displacement of said movable member from said no-load position toward said full-load position, thereby to modify the dependency of the frequency change of the string on the load force and to produce a linear variation in the oscillating frequency with respect to load.

22. Apparatus as defined in claim 5, wherein at least one of said spring means has a non-linear spring characteristic.

23. Apparatus as defined in claim 5 and further including taring spring means (115) for adjusting the tension of at least one of said spring means.

24. Apparatus as defined in claim 5, and further including first parallel lever means (112, 112') connected with said frame member for guiding said pan carrier member for vertical movement, an auxiliary mass (M) having a weight that corresponds with the weight of the pan and pan carrier assembly, second parallel lever means connected with said frame member for guiding said auxiliary mass for vertical movement, said first string member and the corresponding spring means being so connected between said frame and pan carrier members that the tension of the first string is increased upon the application of load to said pan carrier, said second string member and the corresponding spring means being so connected between said frame and said auxiliary mass for tensioning by the normal force of gravity on said auxiliary mass, a lever (133) pivotally connected intermediate its ends with said frame for pivotal movement about a horizontal pivot axis, means (133a, 134a) pivotally connecting one end of said lever with the junction between said second string member and the corresponding spring means (131) for connecting the other end of said lever with said pan carrier member.

25. Apparatus as defined in claim 5, and further including first parallel lever means (112, 112') connected with said frame member for guiding said pan carrier member for vertical movement, an auxiliary mass (M) having a weight that corresponds with the weight of the pan and pan carrier assembly, second parallel level means connected with said frame member for guiding said auxiliary mass for vertical movement, a first one of said string members and the spring means associated therewith being connected between said frame and said pan carrier members and the other of said string members and the spring means associated therewith being connected between said frame member and said auxiliary mass on the same side of said pan carrier member as said first string member, and magnetic means (135, 135') for applying between said string members a repelling force which causes the tensions of said strings to be varied inversely during movement of said pan carrier between said no-load and full-load positions.

* * * * *